US008799538B2

(12) United States Patent
Jenkins et al.

(10) Patent No.: US 8,799,538 B2
(45) Date of Patent: Aug. 5, 2014

(54) SYSTEM FOR MANAGING A COST-CONSTRAINED RESOURCE

(75) Inventors: Tim Jenkins, Kilburn (CA); Dan Cardamore, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 347 days.

(21) Appl. No.: 12/424,856

(22) Filed: Apr. 16, 2009

(65) Prior Publication Data

US 2009/0265486 A1  Oct. 22, 2009

Related U.S. Application Data

(60) Provisional application No. 61/045,893, filed on Apr. 17, 2008.

(51) Int. Cl.
G06F 3/00  (2006.01)

(52) U.S. Cl.
USPC .................. 710/60; 710/36; 710/52; 718/104

(58) Field of Classification Search
USPC ........................................................ 718/104
See application file for complete search history.

(56) References Cited

U.S. PATENT DOCUMENTS

| | | | |
|---|---|---|---|
| 4,719,569 A * | 1/1988 | Ludemann et al. ........... 710/241 |
| 6,504,495 B1 * | 1/2003 | Symes et al. ..................... 341/95 |
| 6,578,096 B1 * | 6/2003 | Steinmetz et al. ............ 710/105 |
| 6,675,246 B1 * | 1/2004 | Molnar et al. ................. 710/240 |
| 6,820,152 B2 * | 11/2004 | Kanzaki et al. ............... 710/244 |
| 6,901,039 B1 * | 5/2005 | Sugie et al. ................. 369/47.28 |
| 7,054,790 B1 * | 5/2006 | Rich ............................... 710/60 |
| 7,337,285 B2 * | 2/2008 | Tanoue .......................... 710/40 |
| 7,596,647 B1 * | 9/2009 | Van Dyke et al. ............ 710/244 |
| 7,843,942 B2 * | 11/2010 | Ogasahara ............... 370/395.41 |
| 2004/0073730 A1 * | 4/2004 | Horii et al. ..................... 710/113 |
| 2004/0255055 A1 * | 12/2004 | Lamberts .......................... 710/5 |

OTHER PUBLICATIONS

Examination Report dated Nov. 2, 2012 for corresponding European Patent Application No. 10159833.2, 7 pages.
Office Action dated Jul. 9, 2012 for corresponding Canadian Patent Application No. 2,699,819, 3 pages.
Dulgheru, Natalia, "Management of QoS in Distributed MPEG Video Systems," 2004, printed from the internet at <http://citeseerx.ist.psu.edu/viewdoc/download?doi=10.1.1.126.3230&rep=rep1&type=pdf> on Aug. 18, 2010, 76 pages.

(Continued)

*Primary Examiner* — Idriss N Alrobaye
*Assistant Examiner* — Dayton Lewis-Taylor
(74) *Attorney, Agent, or Firm* — Brinks Gilson & Lione

(57) ABSTRACT

A system manages access to a cost-constrained resource. The system includes two or more resource consumers that may request access to the cost-constrained resource. Each of the resource consumers may calculate a respective need value corresponding to an amount of data stored in a buffer of the resource consumer relative to a total amount of data that may be stored in the buffer. A concurrency arbitrator may grant access to the cost-constrained resource to a given resource consumer of the plurality of resource consumers based on need values received by the concurrency arbitrator from the plurality of resource consumers. Additionally, or in the alternative, the concurrency arbitrator may grant access to the cost-constrained resource to a given resource consumer based on an amount of data stored in a buffer of the cost-constrained resource that is to be transferred to the given resource consumer.

30 Claims, 9 Drawing Sheets

(56) References Cited

OTHER PUBLICATIONS

Kee-Yin Ng, Joseph et al., "A Distributed MPEG Video Player System with Feedback and QoS Control," Real-Time Computing Systems and Applications, Proceedings of Fifth International Conference on Hiroshima, Japan, Oct. 27-29, Los Alamitos, CA, 1998, 10 pages.

Extended European Search Report dated Sep. 24, 2010 for corresponding European Patent Application No. 10159833.2, 9 pages.

* cited by examiner

SYSTEM FOR MANAGING A COST-CONSTRAINED RESOURCE

CROSS-REFERENCE TO RELATED APPLICATIONS

The present application claims priority to U.S. Provisional Application No. 61/045,893, filed Apr. 17, 2008, titled "System for Managing an Access-Constrained Resource."

BACKGROUND OF THE INVENTION

1. Technical Field

This invention relates to the field of computer resource management, and in particular to a system that manages requests for access to a resource in a processing system.

2. Related Art

Computers, embedded controllers, and other processing systems may include various resources that only respond to a finite number of concurrent requests by resource consumers of the system. Consuming a resource subjects the system to a cost or penalty. The cost penalty may make the resource unavailable to other consumers because it has limited throughput, consume more power, increase system noise or vibration, or incur a cost by using network services. Such cost-constrained resources may include optical storage drives, magnetic storage drives, video controllers, interface controllers, network interface controllers and similar resources. A resource may be cost-constrained in that it may be unable to adequately respond to all the concurrent requests that may occur in the system without degraded performance of the resource and/or system.

A processing system may have various cost-constrained resources such as network interfaces where there is a computational cost imposed on the system to use them. The cost-constrained resource may include an optical media drive, such as a DVD player. The DVD player may have an optical reading head used to read a limited number of data streams, such as a single data stream. The optical media drive may seek the location on the storage media holding requested data in response to a read request. The optical media drive may move the optical head and manipulate the rotating media to the correct location before it starts reading the requested data, all of which requires time. The manner in which these requests are managed may determine how much time is spent reading and how much time is spent searching, which has an impact on the operation and efficiency of the processing system.

Management of the resource requests may also have an impact on the user experience. If the optical media drive spends more time moving the optical head than reading data, then software processes reading from the optical media drive may not receive the requested data in a timely manner. This may result in a system performance degradation that is perceivable by the user. Degradation may be noticeable when the user tries to view a continuous media presentation or rely on similar real-time interaction with the system. Such degradation may result in poor presentation quality (e.g., jittering, pauses, delays and similar erratic behavior).

SUMMARY

A system manages access to a cost-constrained resource. The system includes a plurality of resource consumers that may request access to the cost-constrained resource. Each of the plurality of resource consumers may calculate a respective need value corresponding to an amount of data stored in a buffer of the resource consumer relative to a total amount of data that may be stored in the buffer. A concurrency arbitrator may grant access to the cost-constrained resource to a given resource consumer of the plurality of resource consumers based on need values received by the concurrency arbitrator from the plurality of resource consumers. Also, or in the alternative, the concurrency arbitrator may grant access to the cost-constrained resource to a given resource consumer based on an amount of data stored in a buffer of the cost-constrained resource that is to be transferred to the given resource consumer.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
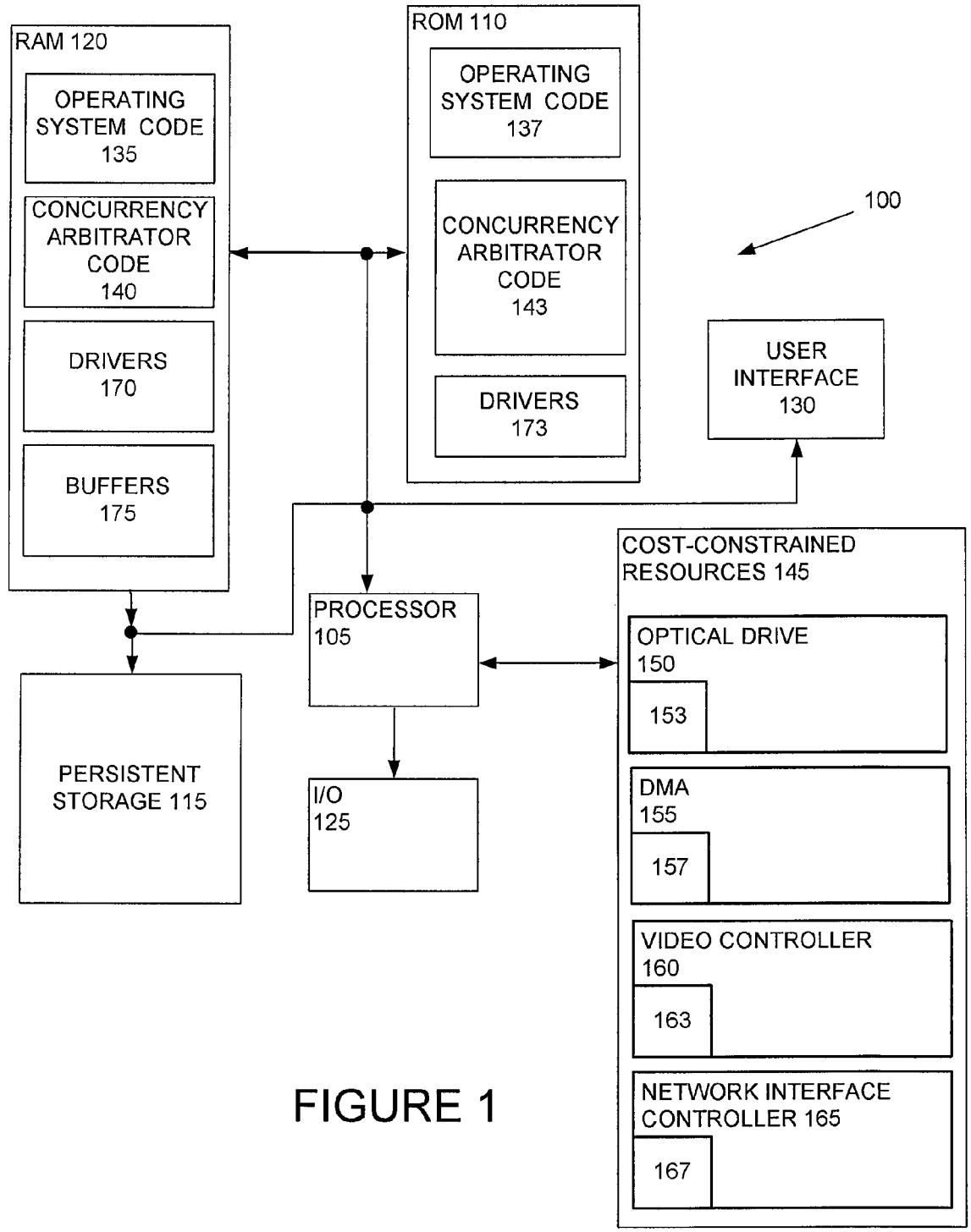
FIG. 1 is a processing system for managing access to a cost-constrained resource.

FIG. 1 is a processing system 100 including a system for managing a cost-constrained resource. The processing system 100 may include one or more processors 105, a memory such as read only memory (ROM) 110, and a persistent storage unit 115. Processing system 100 also may include random access memory (RAM) 120, a user interface 130 and other resources/devices 145.

In FIG. 1, the cost-constrained resources may include an optical drive 150, a direct memory access controller (DMA) 155, a video controller 160, and/or a network interface controller 165. Each cost-constrained resource may include one or more respective buffers, layers, and/or channels. Optical drive 150 is shown with a corresponding buffer 153. DMA 155 is shown with multiple channels and/or buffers 157. Video controller 160 is shown with corresponding video memory 163, which may include multiple video layers. Network interface controller 165 is shown with a corresponding buffer 167. Although each cost-constrained resource 145 is shown with a single buffer/layer/channel, multiple buffers/layers/channels may be employed by one or more of the cost-constrained resources 145.

Read only memory (ROM) 110 may include operating system code 135, concurrency arbitrator code 143, and drivers 173. Such code may be transferred to random access memory 120 in a boot operation at 135, 140, and 170, respectively, where the code may be executed by processor 105.

The operating system code 135 may control the interaction between high-level application programs executed by the processor 105 and hardware components, including memory devices 110 and 120, the persistent storage unit 115, the user interface 130, and the cost-constrained resources 145. The operating system code 135 may include concurrency arbitrator code 140 that is executable by processor 105 to organize and control access to the various cost-constrained resources 145. The cost-constrained resources may include optical storage drives, magnetic storage drives, video cards, direct memory access (DMA) channels, interface cards, hardware subsystems, and other resources. Alternatively, or in addition, the concurrency arbitrator 140 may be stored in and/or executed from a separate medium remote from the operating system code 135. In some systems, the concurrency arbitrator 140 may be stored in read only memory 110, persistent storage unit 115, or in some other storage medium. When the processing system 100 is linked with other computers and/or storage devices, the concurrency arbitrator 140 may be stored remotely and downloaded to the processing system 100 as needed. FIG. 1 illustrates storage of the concurrency arbitrator code at 143 in read only memory 110 from which it is transferred to random access memory 120 for execution by the processor 105.

The persistent storage unit 115 may comprise a hard disk drive, floppy disk drive, etc. It may be a non-rotating media device, such as non-volatile memory implemented in an integrated circuit format (e.g., FLASH memory, etc.). The persistent storage unit 115 need not be limited to a single memory structure. Rather, the persistent storage unit 115 may include separate storage devices of the same type (e.g., all FLASH memory) and/or separate storage devices of different types (e.g., one or more FLASH memory units and one or more hard disk drives).

Figure 2:
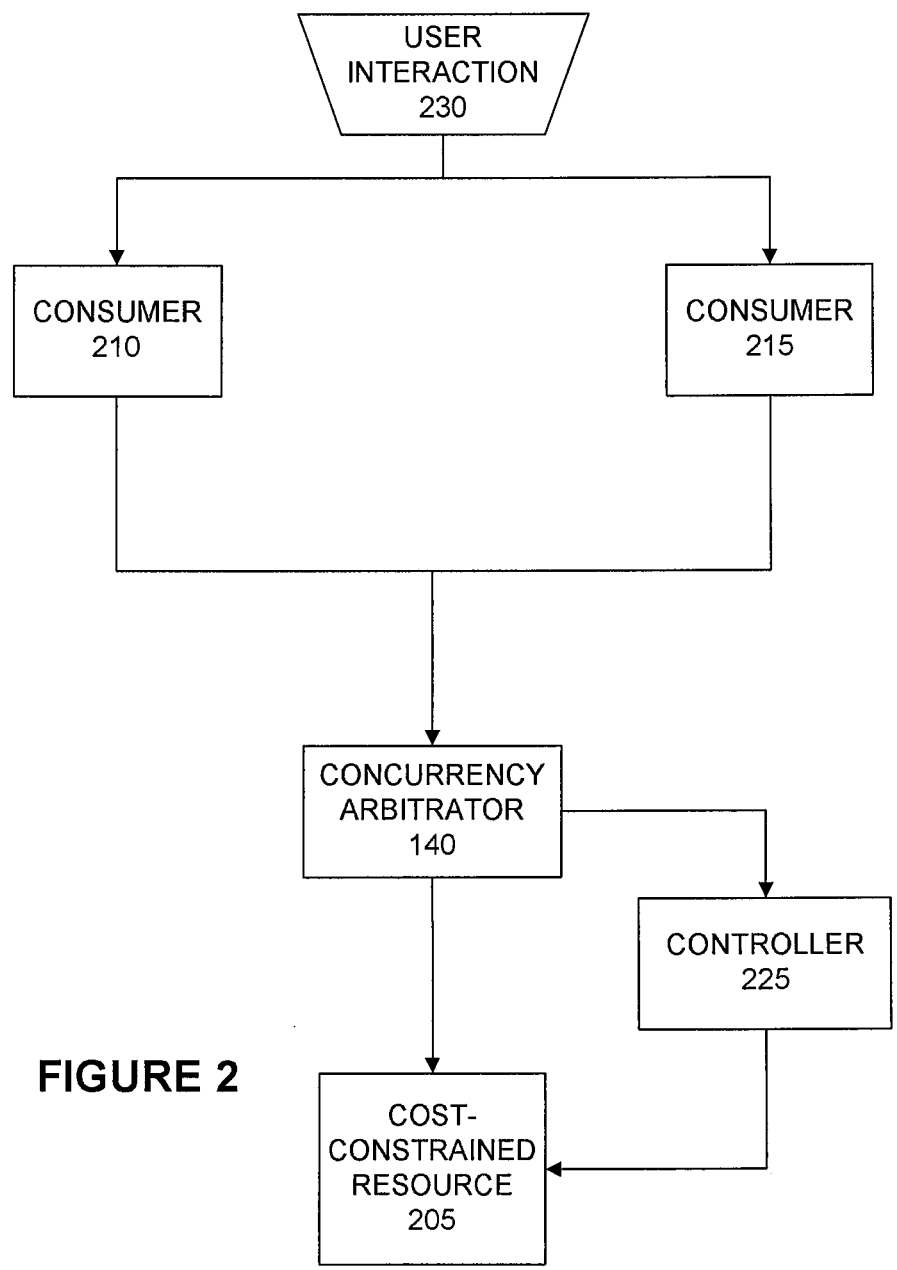
FIG. 2 is a system for managing access to a cost-constrained resource.

FIG. 2 shows components of a cost-constrained resource management system 200. In FIG. 2, a cost-constrained resource 205 is used. The cost-constrained resource 205 may correspond to one or more of the cost-constrained resources 145 shown in FIG. 1. A resource may be cost-constrained in that it may be unable to adequately respond to all the concurrent requests that may occur in the system without degrading performance of the resource itself and/or the system. The cost-constrained resource 205 may be constrained in the number of resource consumers that may access it in a concurrent or substantially concurrent manner. Although the process shown in FIG. 2 may be applied to any cost-constrained resource, the following description of the components is directed to its application in systems in that may include an optical drive 150, such as a DVD player having a single optical read head that may read a single stream of data at a time. Such a DVD player may be limited in its ability to service more than a single data resource consumer at a time.

Two resource consumers 210 and 215 are shown in FIG. 2. The resource consumers 210 and 215 may concurrently request access to the cost-constrained resource 205. 210 and 215 may be software processes, software applications, threads, device, software agents, clients, avatars or other hardware or software related components. Although two consumers 210 and 215 are shown in FIG. 2, there may be additional consumers requesting access to the cost-constrained resource 205 at the same time or nearly the same time.

The resource consumers 210 and 215 may include resource consumers that include data buffers and those that do not include data buffers. Resource consumers with data buffers may receive data from the cost-constrained resource 205 into their data buffers more quickly than they process data from their own data buffers. If this is not true (e.g., the resource consumer processes data from its own data buffer more quickly than the data buffer can be filled from the cost-constrained resource 205), then the resource consumer may need data from the cost-constrained resource 205 for a longer period of time and/or at a higher data transmission rate. In such instances, the system 200 may not be able to share the cost-constrained resource 205 with other resource consumers without an impact on system performance. The performance of the system 200 may degenerate if the resource consumer with the highest priority has exclusive control and consumes the cost-constrained resource 205 without releasing it.

As shown in FIG. 2, requests for access to the cost-constrained resource 205 may be issued by the resource consumers 210 and 215. The access requests may be issued to the cost-constrained resource 205 through the concurrency arbitrator 140. Alternatively, or in addition, the requests for access may be calls to the operating system code 135. When the requests are calls to the operating system 135, the concurrency arbitrator 140 may be implemented as part of the operating system 135 or as an external software process that is the operating system 135. The requests for access to the cost-constrained resource 205 may be implemented as new calls added to an existing API and/or by extending existing calls. Some existing operating system calls may be defined and/or redefined to include data indicative of a 'need' of a consumer process for the cost-constrained resource. This data may be used with the system 200. The concurrency arbitrator 140 may receive the requests for access from the resource consumers 210 and 215, and determine how to allocate access to the cost-constrained resource 205.

The system 200 may also include a resource controller 225 that may manipulate the cost-constrained resource 205 to control the provision of its services to the resource consumers 210 and 215. For example, CD (compact disk) players and/or DVD players may be operated at various rotation rates. When operated at higher rotation rates, the players may consume more power, generate more audible noise, and may cause difficulty reading imperfect disks due to excessive vibration as compared to lower rotation rates. Provided that sufficient data can be provided to the resource consumers 210 and 215 to maintain the quality of the user experience, it may be desirable to operate the CD player and/or DVD player at a lower rotation rate. The concurrency arbitrator 140 may provide the resource controller 225 with an indicator of how quickly the cost-constrained resource 205 should provide its services.

Figure 3:
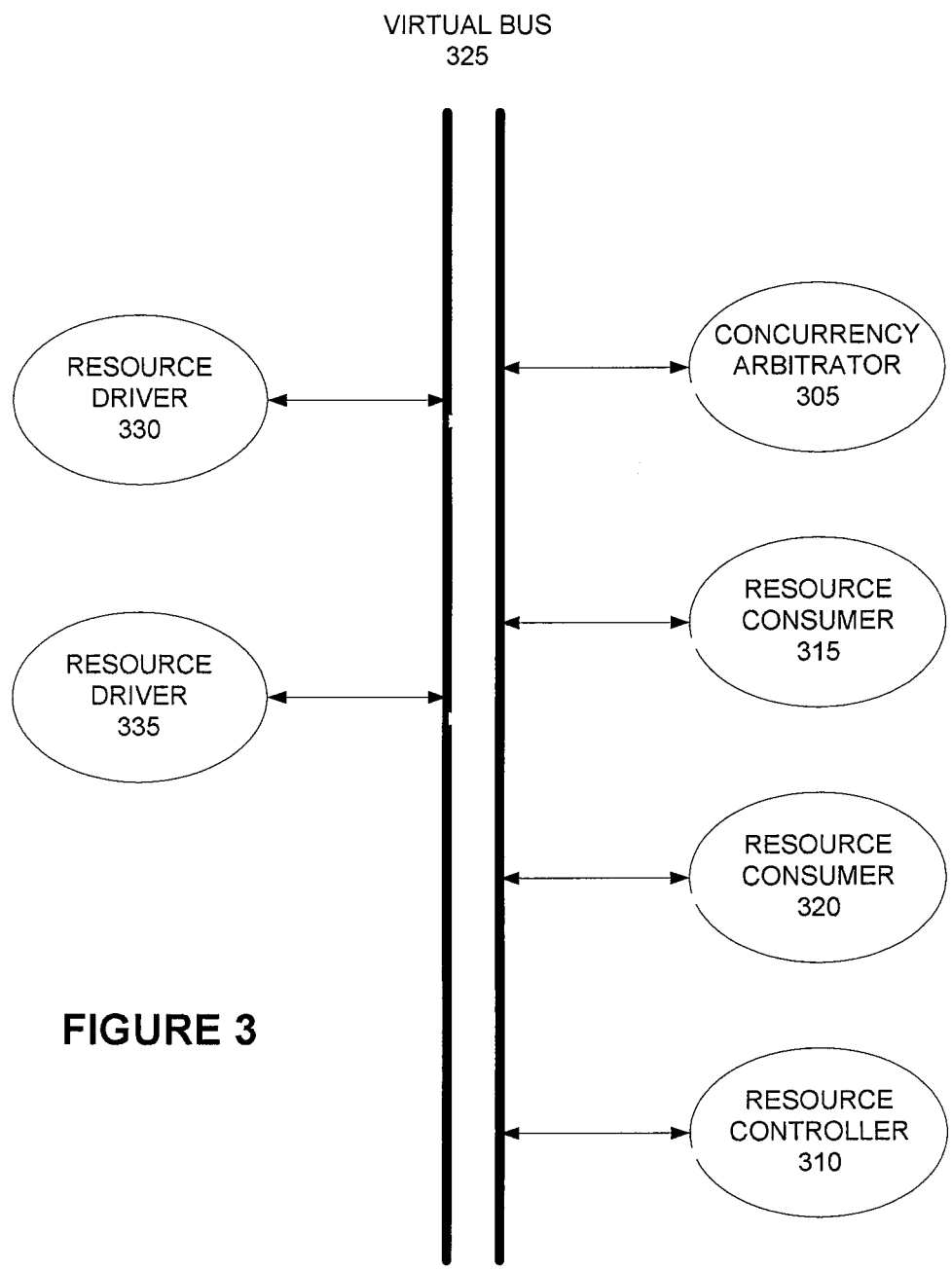
FIG. 3 is a cost-constrained resource management system in a message-passing operating system.

Concurrency arbitrator 140, resource controller 225 and cost-constrained resource 205 may be separate or integrated entities. Alternatively, the resource controller 225 and the cost-constrained resource 205 may be integrated (e.g., unitary devices). The concurrency arbitrator 140, resource controller 225 and cost-constrained resource 205 may be in the form of a file system hierarchically on top of an optical media drive. In a message-passing operating system, the concurrency arbitrator 140 and resource controller 225 may be implemented as separate processes that communicate in the manner shown in FIG. 3 (305 and 310 respectively). In such a system, resource consumer 315 and resource consumer 320 are implemented as executable code that provides access requests to a virtual bus 325, which may be generated by executable code and include memory accessible to the resource consumers, cost-constrained resource 205 and resource controller 225. The access requests are handled by concurrency arbitrator 305 and resource controller 310, which manage access to resource driver 330 and resource driver 335, respectively.

Figure 4:
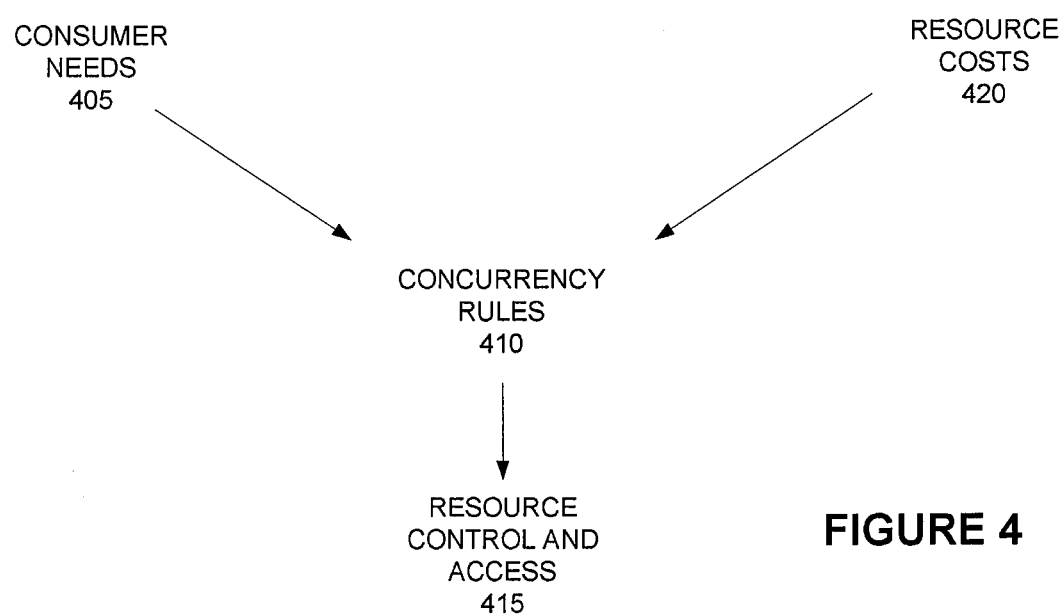
FIG. 4 shows data communications in a process for managing any cost-constrained resource.

FIG. 4 illustrates information that is communicated by the components shown in system 200. In FIG. 4, each consumer 210 and 215 may provide data at 405 and 410, respectively, to the concurrency arbitrator 140. Data 405 and 410 may be indicative of the need that each resource consumer 210 and 215 has for access to the cost-constrained resource 205. The concurrency arbitrator 140 may use the data to determine which resource consumer 210 and/or 215 is to have access to the cost-constrained resource 205 by executing code that applies logical rules 410 to the data. Additionally, the concurrency arbitrator 140 may allocate the cost-constrained resource 205 based on data indicative of the cost 420 of allowing one or more of the resource consumers 210 and 215 access to the cost-constrained resource 205. The cost data 420 may be indicative of various operational characteristics of each of the resource consumers 210 and/or 215. For example, the cost data 420 may include data corresponding to power consumption by the cost-constrained resource 205 under various operating conditions required to meet the need of a given resource consumer. The cost data 420 may also include data corresponding to the data access time of the cost-constrained resource 205 and its relationship to the needs of a given resource consumer. Still further, the cost data 420 may include data corresponding to mechanical limitations of the cost-constrained resource 205 (e.g., an optical drive may vibrate and/or generate noise at different levels depending on the rotation rate of the drive, where the rotation rate may vary depending on which resource consumer is given access to the cost-constrained resource 205).

The concurrency arbitrator 140 may also determine the operating parameters that are used by the cost-constrained resource 205 to provide its services to resource consumers 210 and 215 (e.g., controlling the rotation rate at which an optical drive should operate). The concurrency arbitrator 140 may pass such control data to the resource controller 225, which adjusts the operation of the cost-constrained resource 205 using the control data.

Various operations may be executed by the concurrency arbitrator 140. These operations may include:
(1) determining each resource consumer's need for access to the cost-constrained resource;
(2) determining which resource consumer will have access to the cost-constrained resource; and
(3) determining the manner in which the cost-constrained resource operates (e.g., controlling its operating parameters).

Need and cost data may be associated with the system in a number of manners. In an automobile telematics space, a small number of cost-constrained resources, such as those shown at 145 of FIG. 1, may be used. Once the cost-constrained resources are installed in the system 200, the system may remain static without further additions or removals of the consumer resources and/or cost-constrained resources. Hard-coding of need and cost data may be used in such static systems. Need and cost data may also be loaded onto the system 200 using default values, where the default values may be adjusted using data input menus, and/or automatically loaded when installing the cost-constrained and/or resource consumer devices and/or device codes. When a new cost-constrained resource 205 and/or resource consumer is installed on the system 200, the concurrency arbitrator 140 may become aware of the item and its associated need and/or cost.

Access to the cost-constrained resource 205 may be allocated on the basis of need and cost. In this configuration, resource consumer need may be categorized into a finite number of groups, such as "high", "medium" and "low" priority levels. Greater granularity may allow for more precise distinction between priority levels. Assignment of a need level to a resource consumer may be based on the quantity of data in its data buffer as compared to the total size of the data buffer. A measure of need may initially be provided by a consumer of a cost-constrained resource 205 to the concurrency arbitrator 140. This need may correspond to an initial interpretation by the consumer of the importance of its needs. The consumer may also establish its needs by measuring the amount of data in its receive buffers and/or how much data it has accumulated in its transmission buffers. A consumer that has a small amount of data in its buffers compared to its ability to process that data may express a high need to the concurrency arbitrator 140 for the cost-constrained resource 205. A consumer that has a large amount of data in its buffers compared to its ability to process that data buffer level may have a relatively low need. This manner of establishing objective need levels may be used when the consumers use audio and/or video media data.

Since access to the cost-constrained resource 205 may be allocated on the basis of resource consumer need, a consistent manner of determining that need may be used. To support consumers with different total numbers of buffers and/or buffer storage capacity, the need may be expressed as a normalized value ranging from zero (no need) to one (maximum possible need). The resource consumer and/or concurrency arbitrator 140 may adjust the need value of a resource consumer based on measurements that compare the quantity of data stored in the buffers of the resource consumer with the total storage capacity and/or number of buffers of the resource consumer. The normalized value corresponding to a need of the resource consumer for the cost-constrained resource at a given time may be expressed as:

$$N_i = (T_i - F_i)/T_i$$

where
$N_i$ is the normalized value corresponding to the need of resource consumer i for the cost-constrained resource,
$F_i$ is the number of resource consumer i's buffers that are full and/or the amount of data currently stored in resource consumer i's buffers, and
$T_i$ is the total number of buffers used in the resource consumer i and/or total amount of data that may be stored in consumer i's buffers.

This expression may provide a value between zero and one and may indicate the degree to which the buffers of the resource consumer are filled. It may also provide a process for a resource consumer to express its own objective measurement of its need for access without analyzing data relating to the consumers of the rest of the system. This need determination may be used when resource consumers have buffers of different sizes or the rate at which buffers are filled differ from one another. In these cases, it may impact how quickly the need changes when a particular resource consumer has access to the cost-constrained resource 205.

Other factors may also be used by the concurrency arbitrator 140 when allocating the cost-constrained resource to a resource consumer. The concurrency arbitrator 220 may use a hysteresis or damping function to reduce the frequency with which the concurrency arbitrator 140 attends to the needs of a given resource consumer. The need determination may be based on the buffer use characteristics of the resource consumer. If the resource consumer drains its buffers at a varying rate, the resource consumer may dynamically change its need according to that rate. The need determination may be different for different resource consumers. Care may be taken to avoid increasing the need of a resource consumer while it is accessing the cost-constrained resource 205.

To allow the concurrency arbitrator 140 to compare the needs of potentially disparate consumer types that are independent of each other (e.g., other than the un-buffered resource consumers described above), the needs reported to the concurrency arbitrator 140 by the resource consumers may be weighted or hard-coded for use by the concurrency arbitrator 140. The weightings may be used by the concurrency arbitrator 140 to balance the relative needs of the resource consumers and/or to prioritize access by the resource consumers to the cost-constrained resource 205. While the need values may be expressed based on calculations executed by the resource consumers, the calculations using the weighting may be executed by the concurrency arbitrator 140 to convert the need values to values corresponding to the needs of the various resource consumers from a system perspective (e.g., how important it is to satisfy one consumer's needs, relative to the needs of other consumers).

The $N_i=(T_i-F_i)/T_i$ determination may also be used by resource consumers operating as background resource consumers, where the background resource consumers do not have any buffers (e.g., un-buffered process consumers). The need of an un-buffered resource consumer may be determined using virtual buffers. In determining the need value, the virtual buffers of the un-buffered resource consumer may be assumed to be either empty or full. When the un-buffered process consumer is running, it may set its own normalized need to value of one. Under such circumstances, the virtual buffers of the resource consumer are assumed to be empty. In order to prevent excessive use of the cost-constrained resource by the un-buffered resource consumer, the need of the unbuffered resource consumer may have a weighted value. When the un-buffered resource consumer is not running, it may set its virtual buffers to a full state, driving its normalized need value to zero.

If there is more than one un-buffered resource consumer requesting the cost-constrained resource 205 at the same time, the un-buffered resource consumer with the lowest weighting may not obtain access to the cost-constrained resource 205. Accordingly, resource consumers may be designed with at least one buffer or its functional equivalent. In order to generate a resource consumer with a time varying need based on the $N_i=(T_i-F_i)/T_i$ determination, the un-buffered resource consumer may effectively indicate that all of its buffers are full when it does not need access to the cost-constrained resource. The un-buffered resource consumer may indicate that all of its buffers are empty when it does need access to the cost-constrained resource. A time varying representation of the buffer status may allow resource consumers having a lower standardized need value to also access the cost-constrained resource 205. A round-robin operation may be emulated by periodically cycling each of the un-buffered resource consumer's buffers between empty and full.

Figure 5:
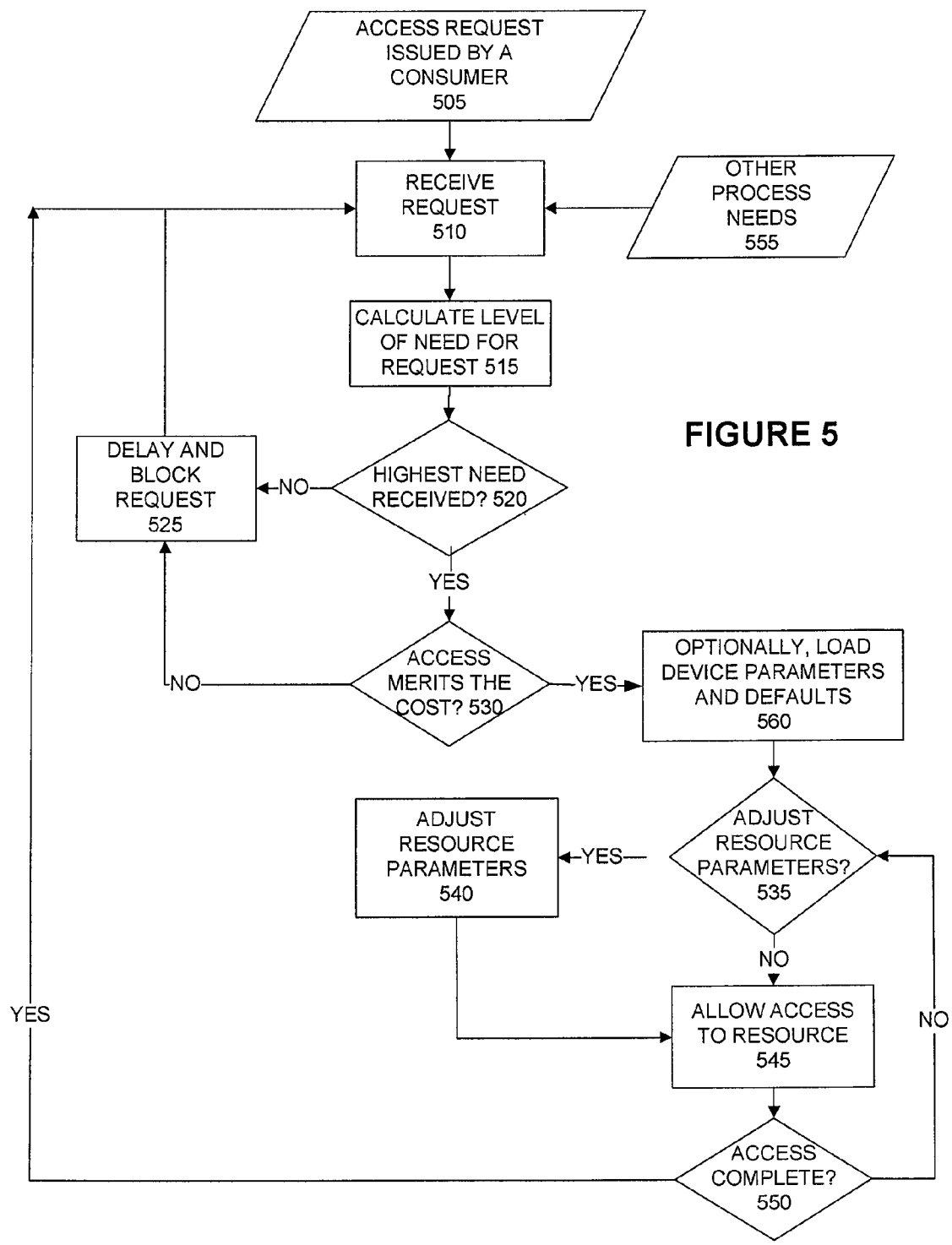
FIG. 5 is a process for managing cost-constrained resources.

FIG. 5 is a further process for managing resource consumer access to a cost-constrained resource. In FIG. 5, the need values may be issued by the resource consumers 210 and 215 at step 505 and may range in value from 0 through to 1. The requests and need values may be received by the concurrency arbitrator 140 at step 510. Other process needs may also be received at step 555 from other resource consumers. The needs of each resource consumer 210 and 215 may be weighted at step 515. Once the needs are weighted, the resource consumer 210 and 215 with the highest need level as calculated by each resource consumer 210 and 215 may be identified at step 520. If a given resource consumer's need level is not the highest, then that access request may be blocked at step 525, and processing may return to step 510. If the given resource consumer's need is the highest priority, then the concurrency arbitrator 140 may grant access to the cost-constrained resource 205. In determining whether the given resource consumer is provided with access to the cost-constrained resource 205, the concurrency arbitrator 140 may determine whether the computational and/or data transfer costs associated with permitting the given resource consumer access to the cost-constrained resource 205 exceed a threshold level. The cost to switch access from one resource consumer to another may be based on the characteristics of the cost-constrained resource 205. With respect to an optical disc reader, the concurrency arbitrator 140 may execute calculations to determine a cost value indicative of the time it takes (e.g., on average) the optical disc reader to seek a new location on the optical media, the amount data that the resource consumer requires, or other processing characteristics. This may correspond to a throughput data value. If this throughput data value is low compared with the need level calculated by the resource consumer, access to the cost-constrained resource by the resource consumer may be inhibited by the concurrency arbitrator 140 until the need level data transmitted by resource consumer to the concurrency arbitrator 140 increases to a threshold need level and/or another resource consumer expresses a higher need level.

The cost level of allowing a resource consumer access to the constrained access resource 205 may be calculated by the concurrency arbitrator 140 at step 530. If the cost is excessive when comparing the calculated cost value with a cost threshold value, then the access request may be blocked at step 525, and processing may be returned to step 510. If the cost level calculated at step 530 does not exceed the threshold need level, then processing may continue at 560. At 560, operating parameters and/or default values related to the operation of the cost-constrained resource 205 may be optionally collected. The parameters/values may include the range of operating rotation rates that a CD drive may use. This information may be used at 335 to calculate whether the operating parameters of the cost-constrained resource 205 are to be changed to accommodate the needs of the resource consumers. If changes are to be made, then the controller 225 may be instructed accordingly by data transmissions from the concurrency arbitrator to the resource controller 225 at step 540. Access to the cost-constrained resource 205 may be granted at step 545. When the access session is complete, control may return to 510.

If the need levels calculated by a resource consumer escalate over time, the resource consumer may avoid an endless loop condition resulting from the operation shown at 530. Each time a resource consumer is rejected at 530, the need level of need may be calculated again at the next iteration of the loop at 515 and transmitted to the concurrency arbitrator 140. The calculated need level may escalate if it fails to gain access to the cost-constrained resource 205 until the calculated need level exceeds the threshold need level and/or other resource consumers express lower need levels. Once at least one or both of these conditions are present, the process consumer may obtain access to the cost-constrained resource number 205.

Figure 6:
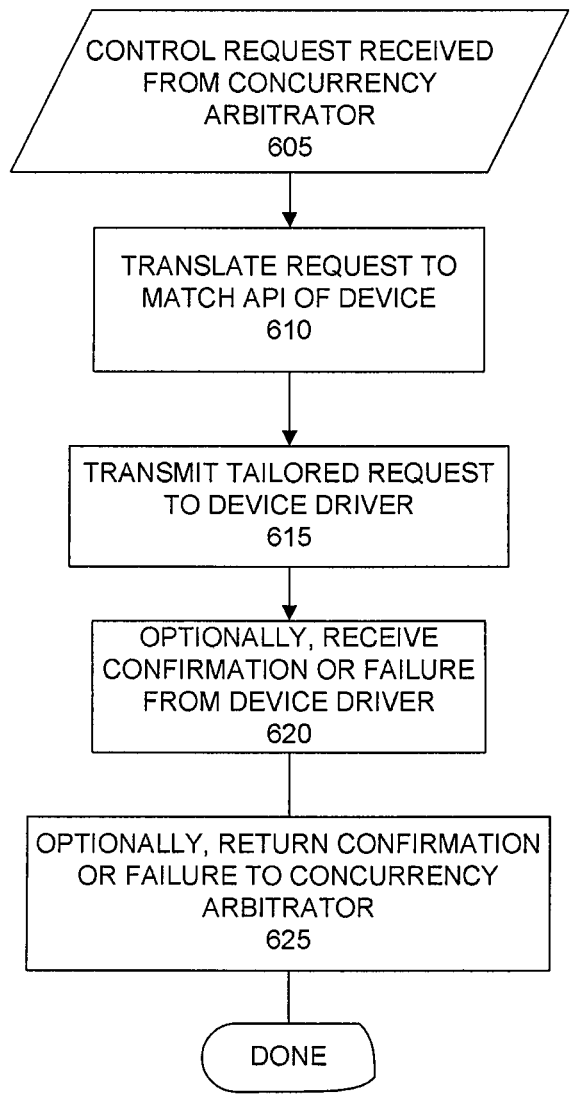
FIG. 6 is a further process for managing a cost-constrained resource using a resource controller to control operating parameters of the cost-constrained resource.

FIG. 6 is a process for controlling a resource controller 225 and operating parameters of the cost-constrained resource 205 shown in FIG. 2. The resource controller 225 may adjust the operating parameters of the cost-constrained resource 205 in response to instructions received from the concurrency arbitrator 140 at step 605. In the case of a CD player or similar device, the instructions may increase or decrease the rate of rotation of the drive. The resource controller 225 may translate the instructions received from the concurrency arbitrator 140 into instructions that are communicated to the API by the software driver for the cost-constrained resource 205 at 610. The API driver instruction data may be transmitted to the software driver for the cost-constrained resource 205 at 615. In response, the software driver may make the requested adjustments to the hardware and/or software operation of the cost-constrained resource 205.

In some cases, the cost-constrained resource 205 and/or its software driver may transmit data to the resource controller 225 confirming that the requested change has been completed. In such instances, the resource controller 225 may communicate the confirmation or failure notification to the system at 620. The system may then communicate the confirmation or failure information to the concurrency arbitrator 140 at 625.

The concurrency arbitrator 140 may execute a hysteresis and/or damping function when determining the needs of the resource consumers. The hysteresis and/or damping function may be used by the concurrency arbitrator 140 to reduce the number of changes that occur in response to resource consumer requests for the cost-constrained resource. The need for and/or use of a hysteresis and/or damping function may be based on the characteristics of the cost-constrained resource when switching between consumers. In the case of an optical disc reader, this may include the time and computational expense used to seek a part of the optical media that is different than the one currently being read.

The need values reported by resource consumers 210 and 215 may be quantized. The concurrency arbitrator 220 may use such quantization to provide hysteresis effects. Hysteresis effects may be suitable when the granularity of the need is large. A resource consumer may also influence the hysteresis and/or damping function by providing a first reporting behavior while the buffers of the resource consumer are filling their buffers and a second reporting behavior while the buffers of the resource consumer are emptied. For example, a resource consumer that reports need values of 0, 0.25, 0.75 and 1 may report data indicative of the maximum of the ranges when filling its buffers and the minimum of the ranges when emptying the buffers. The need of the resource consumer may be maintained until a transition to a smaller need level value occurs. The transition may correspond to the next value in the sequence of granularities.

A number of mechanisms may be used to determine the resource throughput value. The operating/computational costs associated with using the cost-constrained resource 205 and the minimum needs of the resource consumers 210 and 215 requiring access to the cost-constrained resource 205 may be considered in this determination. The cost-constrained resource 205 may provide sufficient throughput to service all resource consumers 210 and 215 at a minimum cost. For example, if running a CD drive at 40× normal rotation rate means twice the power consumption and twice the noise of running it at 20× rotation rate, and it can be determined that 20× is sufficient, then the CD drive should be controlled to run at a 20× rotation rate.

ITo determine the total required throughput, the concurrency arbitrator 140 may use the need values provided by the resource consumers 210 and 215. The concurrency arbitrator 140 may determine the effective sustained data stream rate needed by each resource consumer 210 and 215 for the cost-constrained resource 205. The instantaneous need for the cost-constrained resource 205 may be determined from the sum of the products of each resource consumer's need and its corresponding data stream rate. The need in this case may be an un-weighted need. In a steady state condition, the throughput may be based on an average of these values over a period of time.

A smoothing filter may be applied by the concurrency arbitrator 220 to respond to changes in data throughput needed from the cost-constrained resource 205. The smoothing filter may compensate for sudden increases in demand by the resource consumers for data from cost-constrained resource. The smoothing filter may respond quickly to increases in throughput and respond slowly to decreases in throughput.

Application of this system to a Posix File System API may employ an extension of the Posix API or the use of non-Posix calls. Some systems that provide Posix file system API calls may also support devctl( ) or ioctl( ) calls (device control and input/output control respectively) to perform non-standard operations on files. These mechanisms may allow a file system to provide the roles of concurrency arbitrator 140 and resource controller 225 under a Posix file system API. In these cases, the devctl( ) or ioctl( ) calls may set the bandwidth requirements of the resource consumer and to adjust the need of the next read( ) call. Non-blocking reads may be used as the need changes dynamically. The non-blocking reads may be communicated to the concurrency allocator 140.

Figure 7:
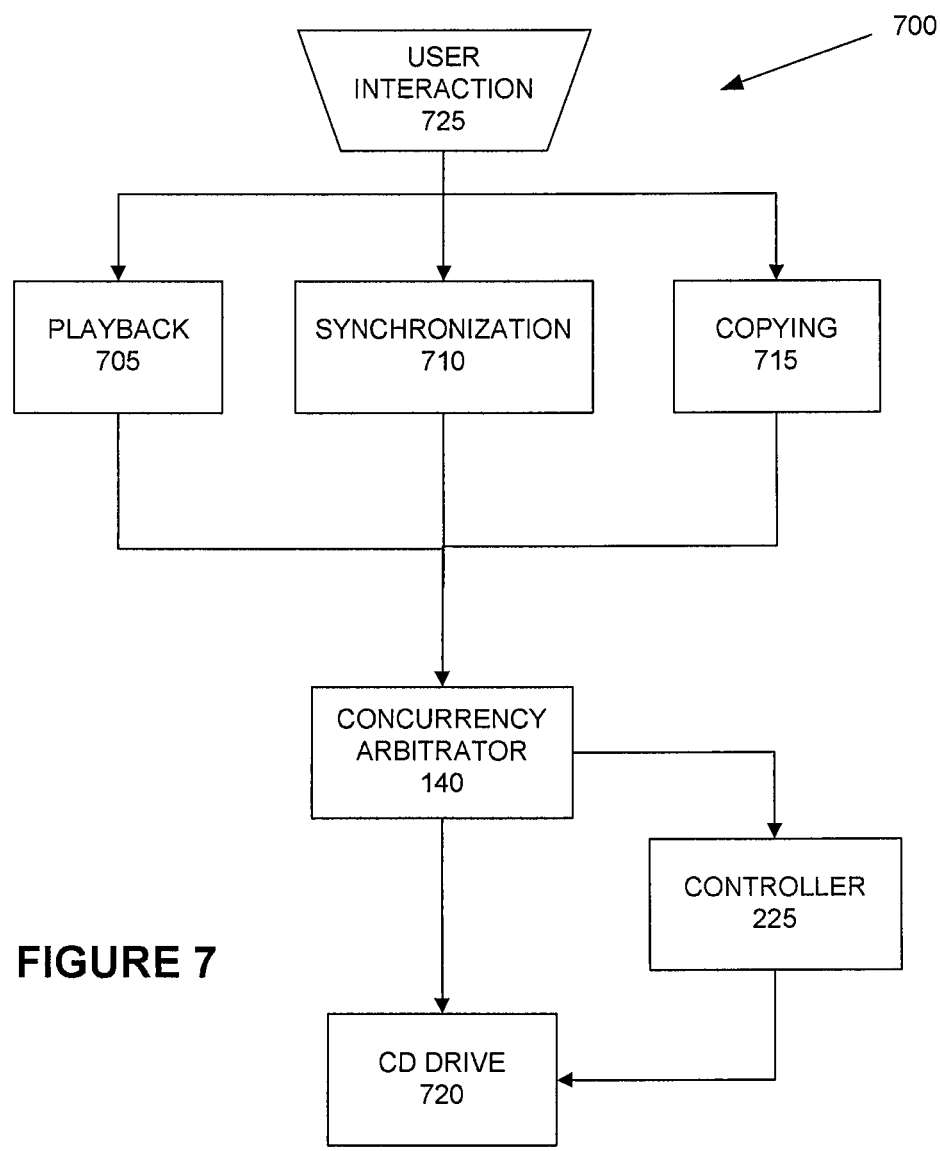
FIG. 7 is a process for managing one or more cost-constrained resources of a media system.

FIG. 7 is a process for managing a media system as a cost-constrained resource. The cost-constrained resource of the media system 700 may be, for example, a CD drive, DVD drive, or similar media resource. In FIG. 7, a user attempts to play media files, synchronize media files (get metadata), and copy files from an optical media, such as a data CD, where the operations take place in a generally concurrent manner. Multimedia system 700 may have resource consumers that include a playback process 705, a synchronization process 710, and a copying process 715 that are responsive to user interaction 725. The concurrency arbitrator 140, resource controller 225, and cost-constrained resource 205 (CD drive 720) may be implemented as a file system that is hierarchically on top of a data CD.

When the CD is inserted into the multimedia system 700 by a user, the synchronization process 710 may begin by requesting blocks of data from each file on the CD media in the CD drive 720 for metadata extraction. The synchronization process 710 may report a need level of "1" when requesting the first block of data from a file and a need level of "0" when it is processing the block.

The media content of the CD may be presented to a user on user interface 130. When the media content is presented to the user, the user may select a file for playback. At this point, the buffers of the playback process 705 may be empty, and it may present a need level of "1" to the concurrency arbitrator 140 thereby requesting a large amount of data for filling its playback buffers. As the buffers are filled, the need level may drop, eventually reaching 0 once its buffers are filled.

The user may also initiate a copy request, where the multimedia files of the CD media in the CD drive 720 are copied to another storage medium, such as a hard drive, USB storage, or other local or remote storage type (e.g. persistent storage 115). The copying process 715 may request access to the CD media of the CD drive 720, and its need may start at level "1" as it attempts to initiate the copying operation. This need may drop as the copying process 715 fills its buffers from the CD drive 720.

Weights may be assigned to each process 705, 710, and 715. The weights may be assigned by a system designer and/or user based on the desired operational priorities. For example, the playback process 705 may have the highest priority weighting and the copying processes 715 may have the lowest priority weighting. When there are multiple requests for the same CD drive 720, the processes will be given access to the CD drive 720 in a priority order that may be based, at least in part, on the assigned weighting.

Since the playback process 705 has the highest weighting value, it will be granted access to the CD drive 720 when its calculated weighted need level value exceeds a need value threshold and/or another resource consumer expresses a higher need level. As it fills its buffers, its weighted priority need begins to drop. Eventually, its need may drop below the weighted priority need of the synchronization process 710. At that point, the synchronization process 710 may be granted access to the CD drive 720. When this happens, the calculated weighted need level of the playback process 705 may begin to increase, and the weighted priority need of the synchronization process 710 may begin to decrease. If hysteresis is used, switching of the access between the playback process 705 and of the synchronization process 710 may occur at determined weighted priority need values depending, for example, on whether the weighted priority need of a process is increasing or decreasing.

Figure 8:
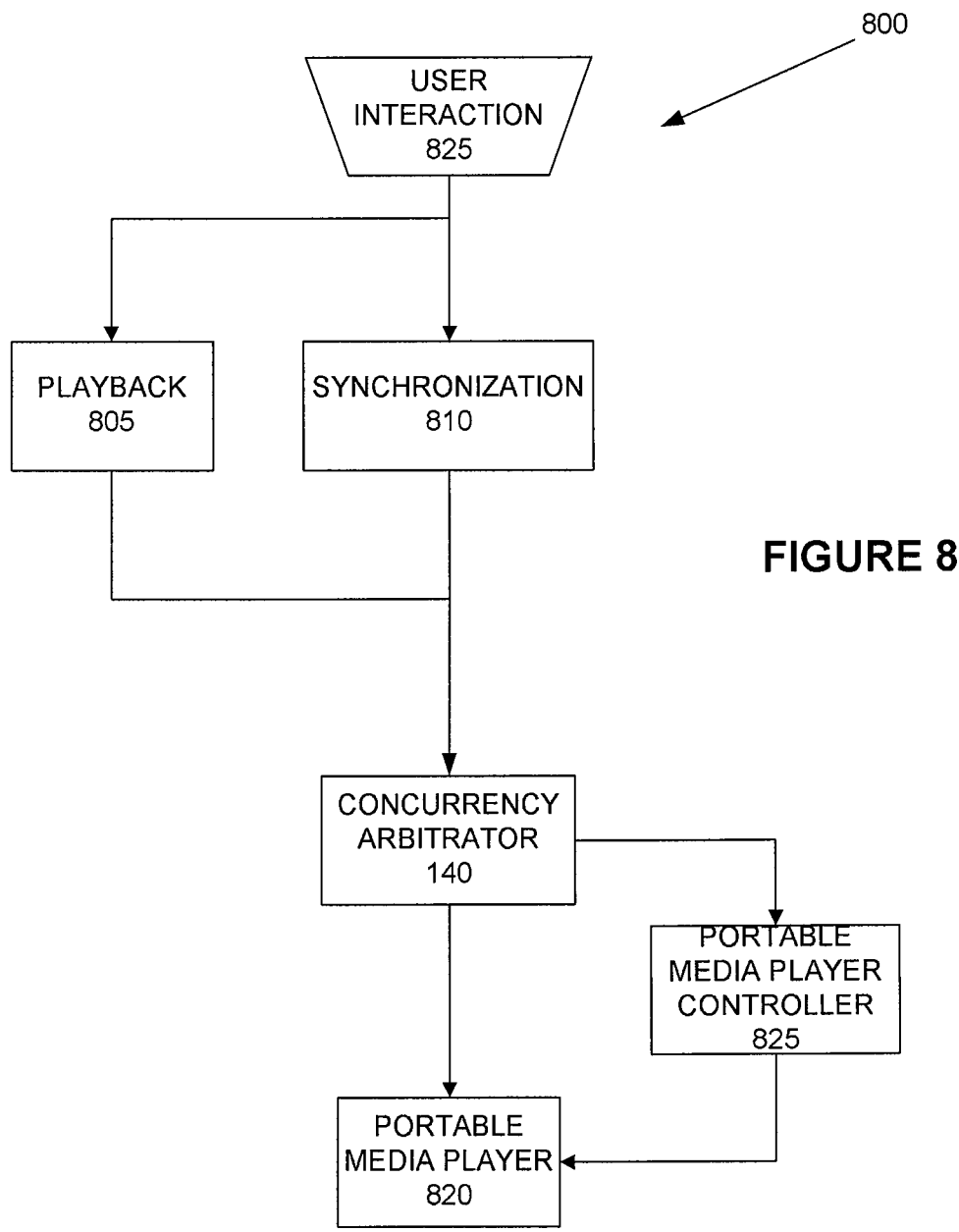
FIG. 8 is a process for managing a portable media player as a cost-constrained resource.

Some media devices, such as an Apple iPod®, may have specific restrictions and software elements associated with them. A process for managing such a device is shown in FIG. 8. In FIG. 8, the system 800 may include a playback process 805 and a synchronization process 810. The system 800 may also have a copying process. However, such copying functionality is not currently supported by the iPod® system but may be included in system 800 for other portable media players. Likewise, concurrent multiple playbacks from an iPod® are not currently supported. Both the playback process 805 and a synchronization process 810 are responsive to user interaction 625.

The concurrency arbitrator 140 may operate in the manner described above. However, the resource controller 825 of system 800 may be specific to a given type of portable media device 820 (e.g., an iPod®). For example, the resource controller 825 may permit multiple accesses to the portable media device 820 (e.g., an iPod®), depending on the type of portable media device. A synchronization process will be granted access at the same time as a playback process, but a second playback process may be blocked under such circumstances.

When a portable media device 820 (e.g., an iPod®) docks with the multimedia system 800, a synchronization process 810 may launch, requesting synchronization data from the portable media device 820. The synchronization process 810 may report a need level of "1" until a substantial portion of the data for synchronization been received.

The media content of the portable media device 820 may be presented to the user on user interface 130. When the media content is presented to the user, the user may select a file for playback. At this point, the buffers of the playback process 805 may be empty, and the playback process 805 may transmit a need level of "1" to the concurrency arbitrator 140 thereby requesting an amount of data for filling its playback buffers. As the buffers are filled, the need level transmitted by the playback process 805 may drop, eventually reaching 0 once its buffers are filled.

Weights may be assigned to the 805 and 810 processes. The weights may be assigned by a system designer and/or by a user based on the desired operational characteristics. For example, playback process 805 may have a higher weighting than the synchronization process 810 once the portable media player 820 has been docked and initial synchronization is substantially complete.

Since the playback process 805 has the highest weighting value in this instance, it may be granted access to the portable media device 820 when its weighted need levels exceed a threshold need level threshold and/or another resource consumer expresses a higher need level. As the playback process 805 fills its buffers with data retrieved from the portable media device 820, its weighted need level may begin to drop. Eventually, the weighted need level may drop below the weighted need level of the synchronization process 810. At that point, the synchronization process 810 may be granted access to the portable media device 820. When this happens, the weighted need level of the playback process 805 may begin to increase, and the weighted need level of the synchronization process 810 may begin to decrease. If hysteresis is used, switching of the access between the playback process 805 and the synchronization process 810 may occur at determined weighted need values depending, for example, on whether the weighted need value transmitted to the concurrency arbitrator 140 by process consumer is increasing or decreasing.

Figure 9:
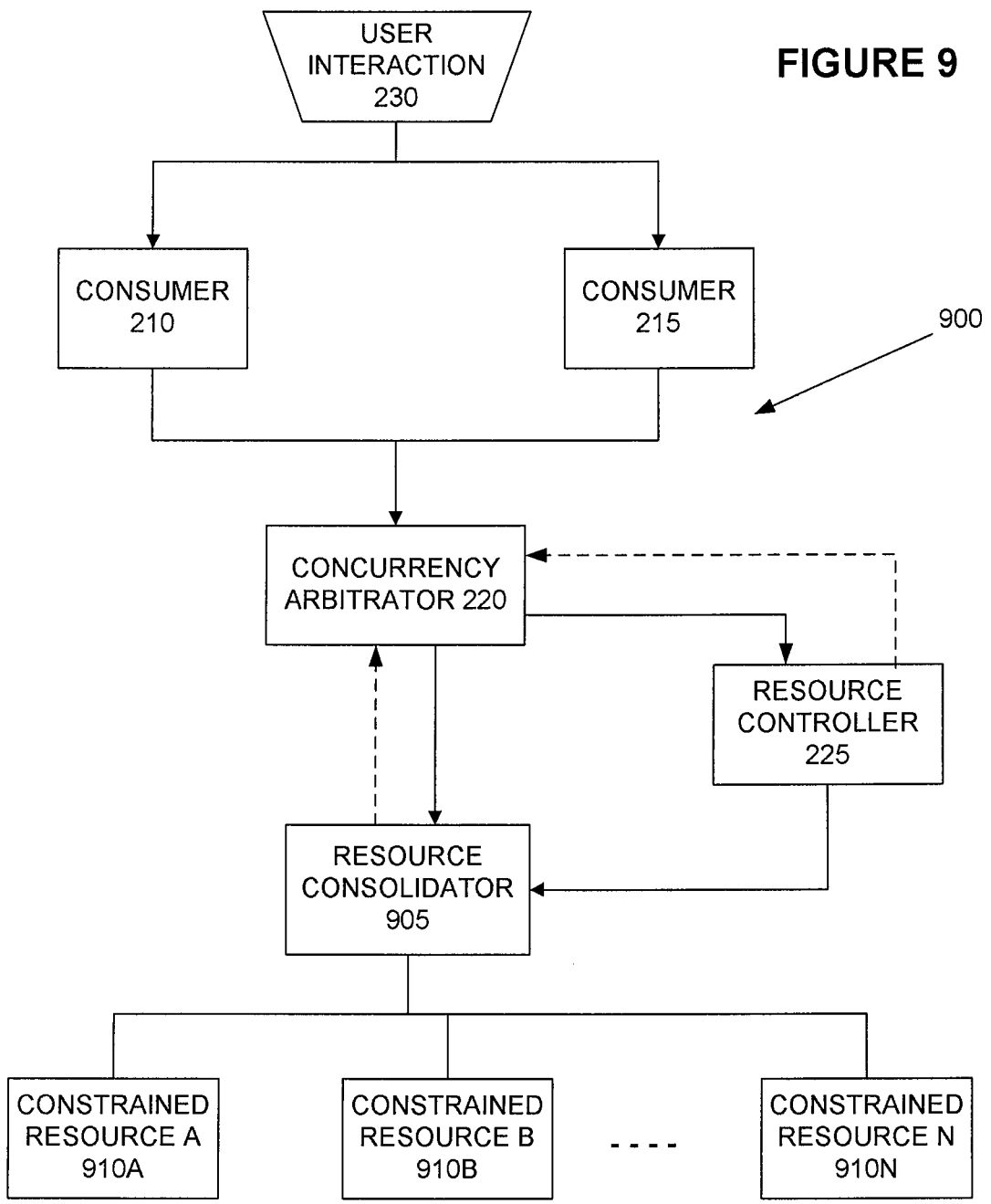
FIG. 9 is a process for managing a plurality of similar cost-constrained resources.

In some cases, the consumer's need levels may be reduced using alternative resources (e.g., a number of hard drives are available for storage), then one or more processors may execute code to implement the process shown in FIG. 9. In FIG. 9, the concurrency arbitrator 140 and resource controller 225 may communicate with a new resource consolidation layer 905. The resource consolidation layer 905 consolidates control of the various like resources available (910A, 910B and 910C). Thus, the concurrency arbitrator 140 and resource controller 225 do not need to be provided with data indicative of the fact that multiple like resources (910A, 910B and 910C) exist. Rather, the concurrency arbitrator 140 and resource controller 225 may operate and communicate to handle the multiple like resources (910A, 910B and 910C) without execution of code by the concurrency arbitrator 140 and resource controller 225 that is specific to the multiple like resources. Rather, such operations are delegated to the resource consolidation process 905. Additionally, or in the alternative, a similar result may be obtained by running a service such as MP (MultiLink PPP) on a network interface, where the service provides an aggregated link capacity over multiple links. The cost-constrained resource may be viewed as a single accessible interface created over the multiple network links.

The concurrency arbitrator 140 may grant access to the cost-constrained resource 205 concurrently to multiple resource consumers 210 and 215. Such concurrent access may be granted in situations where the cost-constrained resource 205 is capable of meeting the needs of the multiple resource consumers. Where the cost-constrained resource 205 is unable to meet all of the current needs of the resource consumers in the system, the concurrency arbitrator 140 may determine which of the multiple resource consumers are to have access to the cost-constrained resource based on the need criterion, such as the need values calculated by each of the resource consumers. Multiple resource consumers expressing the greatest need values may be concurrently given access to the cost-constrained resource provided the cost-constrained resource can meet such concurrent needs. In situations in which the operation of the cost-constrained resource can only provide for the needs of a single resource consumer, the concurrency arbitrator may grant such access based on the need values provided by all of the resource consumers concurrently requesting access to the cost-constrained resource.

This system and method may be applied to a broad range of processing systems. Such processing systems may include direct memory access controllers, video cards, and interface cards. To this end, a DMA controller may have a finite number of independently programmable DMA channels or engines. Since the number of channels is cost-constrained, it may be desirable to employ a concurrency arbitrator 140 to ensure that the highest priority resource consumers have the access to the DMA that they may need. A video card may have a finite number of layers, finite memory, or other finite parameters that may be managed using a concurrency arbitrator. Resource consumers may want to write a certain amount of data to a video card and find that their transmit buffers are filling up. In such a situation, the cost-constrained resource may serve as a data sink. As such, a concurrency arbitrator 140 may prioritize the need of a resource consumer to empty their buffers as they become full. Similar to the case of the video controllers, interface cards may have cost-constraints that work in either direction (e.g., measuring the need level of a process consumer based on the amount of data in the send buffers of the process consumer). For example, an interface controller, such as network interface controller 165, may only be a single resource consumer at a time, in which case access may be prioritized. Conversely, an interface controller may have a limited set of transmit buffers, so management of transmissions in the send direction may be desired.

The system present controls access to a cost-constrained resource by an arbitrary number of resource consumers of the resource, where the access is controlled using various behaviors of the cost-constrained resource and resource consumers. The system may also determine how the cost-constraint resource should provide its services. The system may provide control of access to the cost-constrained resources such that the most important system operations are given priority of access to the cost-constrained resources. The system may also dynamically adjust access to the cost-constrained resource. Still further, the manner in which the cost-constrained resource is used may be optimized based on the demands put upon it by the resource consumers.

The methods and descriptions set forth above may be encoded in a signal bearing medium, a computer readable medium or a computer readable storage medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, a powertrain controller, an entertainment and/or comfort controller of a vehicle or non-volatile or volatile memory remote from or resident to the system 100. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, a processor-containing system that includes an input and output interface that may communicate with an automotive or wireless communication bus through any hardwired or wireless automotive communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/ or interpreted or otherwise processed. The processed medium may then be stored in a local or remote computer and/or a machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
a cost-constrained resource wherein the cost-constrained resource is constrained by the number of resource consumers that can access it concurrently;
a plurality of resource consumers adapted to request access to the cost-constrained resource, where each of the plurality of resource consumers calculates need values that indicate the need that each resource consumer has for access for the cost-constrained resource based on an amount of data stored in a data buffer of the resource consumer relative to a total amount of data that the data buffer is operable to store, wherein the data stored in the data buffer is processed by the resource consumer; and
a concurrency arbitrator adapted to receive concurrent requests from at least two of the plurality of resource consumers and use the need values of each of the resource consumers to determine which resource consumer is to have access to the cost-constrained resource and grant access to the cost-constrained resource to the determined resource consumer of the plurality of resource consumers based on the need values received from the plurality of resource consumers by the concurrency arbitrator.

2. The system of claim 1, where the concurrency arbitrator is further adapted to grant access to the cost-constrained resource to a given resource consumer of the plurality of resource consumers based on an amount of data stored in a data buffer of the cost-constrained resource that is to be transferred to the given resource consumer.

3. The system of claim 1, where the need values of each resource consumer are normalized with respect to one another.

4. The system of claim 3, where the need values of each resource consumer are quantized to predetermined quantization values.

5. The system of claim 4, wherein the concurrency arbitrator executes a hysteresis operation on normalized need values received from a resource consumer to thereby reduce a frequency with which the concurrency arbitrator responds to changes in need values provided by the resource consumer to the concurrency arbitrator.

6. The system of claim 3, wherein the need values for each resource consumer are weighted.

7. The system of claim 3, where the need values are weighted, where the weighted values are used by the concurrency arbitrator to prioritize access to the cost-constrained resource by the plurality of resource consumers.

8. The system of claim 1, where the concurrency arbitrator is adapted to grant access to the cost-constrained resource concurrently to more than one of the plurality of resource consumers.

9. The system of claim 1, where the concurrency arbitrator facilitates control of a rate of data output from the cost-constrained resource to the plurality of resource consumers in response to throughput requirements of the plurality of resource consumers.

10. The system of claim 9, where the concurrency arbitrator comprises a smoothing filter so that the concurrency arbitrator responds to increases in the throughput requirements more quickly than decreases in the throughput requirements.

11. The system of claim 1, where the concurrency arbitrator communicates with a controller of the cost-constrained resource to control operating parameters of the cost-constrained resource.

12. The system of claim 11, where the operating parameter comprises a rotation rate of an optical drive.

13. The system of claim 1, where one or more of the plurality of resource consumers is un-buffered.

14. The system of claim 13, where at least one of the un-buffered resource consumers comprises a virtual buffer.

15. The system of claim 14, wherein, in instances when the at least one of the un-buffered resource consumers comprising a virtual buffer is processing data, the at least one of the un-buffered resource consumers sets its need value in accordance with a full buffer and in instances when the at least one of the resource consumers comprising a virtual buffer is not processing data, the at least one of the resource consumers comprising a virtual buffer sets its need value in accordance with an empty buffer.

16. The system of claim 1, wherein the concurrency arbitrator is configured to provide to a resource consumer of the plurality of resource consumers an indicator of how quickly the cost-constrained resource should provide services to the resource consumer.

17. The system of claim 1, wherein, the concurrency arbiter is further operable to use cost data indicative of the cost of allowing one or more of the plurality of resource consumers access to the cost-constrained resource to determine which resource consumer is to have access to the cost-constrained resource, and grant access to the determined resource consumer of the plurality of resource consumers based on the cost data.

18. A system comprising:
a cost-constrained resource wherein the cost-constrained resource is constrained by the number of resource consumers that can access it concurrently;
a plurality of resource consumers adapted to request access to the cost-constrained resource, where each of the plurality of resource consumers is adapted to provide values corresponding to a degree of need that the resource consumer has for access to the cost-constrained resource, the degree of need is determined based on an amount of data stored in a data buffer of the cost-constrained resource relative to a total amount of data that the data buffer is operable to store, wherein the data stored in the data buffer is processed by the resource consumer; and
a concurrency arbitrator adapted to:
receive concurrent requests from at least two of the plurality of resource consumers;
determine a need value for each resource consumer requesting access to the cost-constrained resource, where the need value corresponds to the values provided by the plurality of resource consumers;
determine which resource consumer is to have access to the cost-constrained resource;
grant access by the determined resource consumer to the cost-constrained resource based on the determined need value; and
control a rate of data output from the cost-constrained resource to the plurality of resource consumers based on data throughput requirements of the plurality of resource consumers.

19. The system of claim 18, where the values provided by the plurality of resource consumers are normalized with respect to one another.

20. The system of claim 18, wherein the need values for each resource consumer are weighted.

21. The system of claim 18, wherein the concurrency arbitrator is configured to provide to a resource consumer of the plurality of resource consumers an indicator of how quickly the cost-constrained resource should provide services to the resource consumer.

22. A system comprising:
a cost-constrained resource wherein the cost-constrained resource is constrained by the number of resource consumers that can access it concurrently;
a plurality of resource consumers adapted to request access to the cost-constrained resource, where the cost constrained resource includes one or more buffers storing data that is to be transferred to at least two of the plurality of resource consumers; and
a concurrency arbitrator adapted to:
receive concurrent requests from at least two of the plurality of resource consumers;
determine which resource consumer is to have access to the cost-constrained resource; and
grant access to the cost-constrained resource to a given resource consumer of the at least two of the plurality of resource consumers based on an amount of data stored in the one or more buffers of the cost-constrained resource that is to be transferred to the given resource consumer.

23. The system of claim 22, where the concurrency arbitrator is further adapted to grant access to the cost-constrained resource to a given resource consumer of the plurality of resource consumers based on an amount of data stored in a data buffer of the given resource consumer.

24. The system of claim 22, wherein the concurrency arbitrator is configured to provide to a resource consumer of the plurality of resource consumers an indicator of how quickly the cost-constrained resource should provide services to the resource consumer.

25. A method for controlling access to a cost-constrained resource comprising:

requesting access to the cost-constrained resource by a plurality of resource consumers wherein the cost-constrained resource is constrained by the number of resource consumers that can access it concurrently;

generating need values in each of the plurality of resource consumers that indicate the need that each resource consumer has for access for the cost-constrained resource, where the need values are based on an amount of data stored in a data buffer of the respective resource consumer relative to a total amount of data that the data buffer is operable to store, wherein the data stored in the data buffer is processed by the resource consumer;

transmitting the need values to a concurrency arbitrator; and controlling access to the cost-constrained resource using the concurrency arbitrator wherein the concurrency arbitrator is adapted to receive concurrent requests from at least two of the plurality of resource consumers and use the need values of each of the resource consumers to determine which resource consumer is to have access to the cost-constrained resource, where the concurrency arbitrator grants access to the cost-constrained resource to a determined resource consumer based on the need values provided by the plurality of resource consumers.

26. The method of claim 25, further comprising normalizing the need values of each resource consumer with respect to one another.

27. The method of claim 26, further comprising quantizing the need values of each resource consumer to predetermined quantization values.

28. The method of claim 26, further comprising weighting the need values for each of the plurality of resource consumers.

29. The method of claim 25, further comprising controlling a rate of data output from the cost-constrained resource to the plurality of resource consumers in response to throughput requirements of the plurality of resource consumers.

30. The method of claim 25, further comprising:

providing to a resource consumer of the plurality of resource consumers an indicator of how quickly the cost-constrained resource should provide services to the resource consumer.

\* \* \* \* \*